United States Patent [19]
Holter et al.

[11] Patent Number: 5,826,672
[45] Date of Patent: Oct. 27, 1998

[54] HOOD LATCH ASSEMBLY FOR A VEHICLE

[75] Inventors: Dean Holter, Portland; Thomas A. Leslie, Tigard, both of Oreg.

[73] Assignee: Freightliner Corporation, Portland, Oreg.

[21] Appl. No.: 642,926

[22] Filed: May 6, 1996

[51] Int. Cl.$^6$ .................................................. B62D 25/12
[52] U.S. Cl. .............. 180/69.21; 292/229; 292/DIG. 14
[58] Field of Search ............................... 180/69.2, 69.21, 180/69.22, 69.23; 292/229, DIG. 14

[56] References Cited

U.S. PATENT DOCUMENTS

| | | | |
|---|---|---|---|
| 2,322,630 | 6/1943 | Greig ..................................... | 180/69.21 |
| 3,274,638 | 9/1966 | Bien ..................................... | 180/69.2 X |
| 3,976,157 | 8/1976 | Wahnemuehl ......................... | 180/69.2 |
| 4,889,203 | 12/1989 | Hagarty ................................ | 180/69.21 X |

FOREIGN PATENT DOCUMENTS

| | | | |
|---|---|---|---|
| 2534618 | 4/1984 | France .................................. | 180/69.2 |

OTHER PUBLICATIONS

Southco Latches and Access Hardware Handbook 44 NA, published by Southco, Inc., 1994, pp. H1–H30.
Freightliner Drawings D17–12393, 12019, 12434, 12435, 12438 and 12439 of prior art hood latches used in Freightliner trucks.

*Primary Examiner*—F. J. Bartuska
*Attorney, Agent, or Firm*—Klarquist Sparkman Campbell Leigh & Whinston, LLP

[57] ABSTRACT

A vehicle with a hood latch assembly includes a latch and latch catch having relative positions which are maintained as the hood closed position of the hood is adjusted to thereby maintain a substantially constant load on the latch assembly. The assembly may include a latch catch with a latch body having an upper hood engaging surface for engaging the hood and isolating hood vibrations. An upwardly projecting neck of the latch catch includes an enlarged head portion with a latch engaging pin. A latch mount incorporated into the latch catch is utilized for coupling the latch catch to a vehicle body. The latch mount may be slidably mounted to a flange of a mounting bracket which is fixedly mounted to the vehicle body. A stop mounted to the vehicle hood engages the upper surface of the latch catch when the hood is in the hood closed position. The latch includes a latch base, a handle pivoted thereto, and a latch hook having a pivot portion pivoted within a yoke of the handle and a hook. The hook is biased away from the latch catch by a biasing element. One surface of the latch hook is friction-enhanced to facilitate manual movement of the latch hook in opposition to the force applied by the biasing element.

26 Claims, 6 Drawing Sheets

HOOD LATCH ASSEMBLY FOR A VEHICLE

BACKGROUND OF THE INVENTION

The present invention relates to a vehicle hood latch assembly for latching the hood of a vehicle, such as a truck, to the body of the vehicle.

It is common for a vehicle such as a truck to have a hood mounted to the body for movement between open and closed positions. For example, a lower forward portion of the hood may be pivoted to the vehicle body such that at least one portion, in this case the rear portion, of the hood is moved upwardly about a hood pivot axis as the hood is opened. To maintain the hood in a closed position when the vehicle is traveling down the highway and at other times, a hood latch assembly is typically provided.

Commonly used prior art hood latch assemblies are produced by Southco, Inc. of Concordville, Pa. and are designated the 274 Series, 277 Series, 284 Series, and 287 Series. These hood latch assemblies include a latch catch fixedly mounted to the vehicle, typically to a hood exterior surface of the vehicle. In addition, they include a latch pivoted to a latch mounting bracket which is fixedly mounted in place, typically to an exterior fender surface of the vehicle. The latch has a latch body of rubber which is pivoted at one end to the latch mounting bracket. A lever is pivoted to the latch body at the end of the latch body spaced from the latch mounting bracket. The lever includes a pin which is positioned within a slot of the latch catch with the lever then being pivoted to lock the lever against the latch catch when the hood is latched in its closed position. The latch body is stretched during latching to apply a latching force to the hood. These Southco hood latch assemblies apply average clamping forces ranging from 27 pounds to 99 pounds, depending upon factors such as which one of the series of latch assemblies is being used and the distance between the latch catch and latch mounting bracket.

Another hood latch mechanism known in the art has been used on Freightliner Corporation vehicles and includes a latch catch in the form of a hook which is fixedly mounted to an exterior surface of the vehicle hood. A latch of rubber is pivoted to a latch base which, in turn, is fixedly mounted to an exterior surface of the fender. The latch is pivoted into a position wherein a portion of the latch engages the hook to apply a closing force and maintains the hood in a closed position.

As pointed out above, in each of these types of hood latch assemblies, the latch catch and latch mounting bracket are fixedly mounted to a respective hood or fender or body of the vehicle. During vehicle manufacture, it is common to adjust the hood closing position to, for example, improve the alignment of the hood with fender and other vehicle components. However, when the hood is adjusted, due to the relative fixed positions of the latch catch and latch mounting brackets in the approaches known to be used for hood latching, the load or hood closing force applied between the latch and latch catch is varied. That is, assume the hood closed position is moved to space the hood further from the fender. In this case, a greater clamping force or load is exerted between the latch and latch catch because the rubber latch elements of these devices are stretched to a greater extent when the latch and latch catch are in latching engagement. Conversely, if the hood position is adjusted to position the hood closer to the fender, the clamping force or load is reduced because the rubber latch elements are stretched to a lesser extent. Varying the load on the latch assemblies affects their useful life. For example, if the latch assemblies are overly taut when latched, the latches tend to wear out faster and also tend to be more difficult to latch. Conversely, if the latch applies an overly reduced clamping force, hood vibration and reliable latching may be adversely affected.

In addition, hood latch assemblies of the type described above are typically mounted with the latch body positioned with its longitudinal axis angled with respect to vertical. When the hood of a typical vehicle is closed, the hood moves substantially in a vertical direction as it approaches the closed position. Therefore, more effective clamping takes place if the hood clamping forces are applied in the direction at which the hood is moving when it reaches its closed position (e.g., a vertical or downward direction).

Furthermore, the prior art Freightliner and Southco hood latches mentioned above are mounted to the exterior of the vehicle fender and hood surfaces where they are impacted by air flowing along the exterior of the vehicle, thereby increasing the wind resistance of the vehicle as the vehicle travels.

Therefore, a need exists for an improved and reliable latch assembly for a vehicle which is directed toward overcoming these and other disadvantages of the prior art, individually or collectively.

SUMMARY OF THE INVENTION

In the present invention, a vehicle has a hood mounted to a body of a vehicle for movement between open and closed positions. At least one portion of the hood moves upwardly as the hood is opened. Typically, the upwardly moving portion of the hood is at the rear of the hood in the case where the hood is pivoted to the vehicle body about a pivot axis located toward the lower front portion of the vehicle.

In accordance with one aspect of the invention, the closed position of the hood is adjustable such that said one portion of the hood raises or lowers as the closed position of the hood is adjusted. The hood latch assembly comprises a latch which is coupled to one of the vehicle hood or vehicle body and a latch catch coupled to the other of the vehicle hood or vehicle body. The latch catch and latch are positioned such that the latch catch is engaged by the latch to latch the hood to the vehicle body when the hood is in the hood closed position. In addition, at least one of the latch catch and latch are adjustable to permit adjustment of the relative positions of the latch and latch catch as the closed position of the hood is adjusted. By maintaining the relative positions of the latch and latch catch substantially constant, a substantially constant clamping load is maintained on the latch assembly even though the hood closed position is varied. In a specifically preferred form of the invention, the latch catch is adjustable to maintain substantially constant relative positions of the latch and latch catch.

As another aspect of the invention, the latch catch is preferably coupled to the body of the vehicle by a mounting bracket. In addition, the latch catch is movably mounted to the mounting bracket. By selectively moving the latch catch relative to the mounting bracket, the relative position of the latch and latch catch may be maintained. In a specific embodiment of the invention, the latch catch is preferably slidably coupled to the mounting bracket so that it may be raised and lowered relative to the bracket. In addition, an elevation adjustment element may be coupled to the mounting bracket or vehicle and also to the latch catch. Adjustment of the elevation adjustment element, which may comprise a bolt threadably coupled to the mounting bracket for axial shifting motion, raises or lowers the latch catch relative to the mounting bracket and thereby adjusts the relative position of the latch catch to the latch as desired.

To facilitate the adjustment of the latch and latch catch during adjustment of the hood closed position, the hood latch assembly is most preferably constructed so that one of the latch and latch catch, and preferably the latch catch, is simultaneously adjusted as the closed position of the hood is adjusted. Consequently, as the hood closed position is adjusted, the relative position of the latch and latch catch is automatically maintained.

In a specifically illustrated embodiment of the present invention, the latch catch is coupled to the vehicle body and the latch is coupled to the hood. In addition, the latch catch includes a latch engagement portion which is engaged by the latch when the hood is latched by the latch assembly in a closed position. Moreover, in this embodiment, the latch catch also includes a hood engaging portion which engages the hood when the hood is in the hood closed position. With this construction, the latch catch is selectively raisable and lowerable relative to the vehicle body to thereby raise or lower the latch engaging portion and the hood engaging portion simultaneously. Consequently, adjustment of the position of the latch catch adjusts the hood closed position, due to the raising or lowering of the hood engaging portion; and also maintains the relative position of the latch and latch catch due to the simultaneous raising or lowering of the latch engaging portion. As a result, the load on the latch assembly is maintained substantially constant, even as the hood closed position is adjusted.

As yet another aspect of an illustrated embodiment of the present invention, the latch catch includes a catch body with the latch engaging portion projecting outwardly from the catch body. In addition, the hood engaging portion comprises a portion of the catch body. More specifically, the hood engaging portion may comprise an exposed surface of the catch body and may preferably be formed of a resilient material to dampen vibration of the hood when the hood is latched in the hood closed position. The hood engagement portion or surface may define a recess for receiving a stop mounted to the hood when the hood is in the hood closed position. The stop may include a pin which is received by and positioned within the hood engagement surface recess.

As yet a more specific aspect of this embodiment of the present invention, the latch engaging portion comprises an elongated neck which projects from the catch body. The elongated neck has a section which consists essentially of an elastomeric material, such as rubber. In addition, the neck has an enlarged head portion spaced from the catch body within which a latch pin receiving insert is embedded. A latch pin is positioned in the latch pin receiving insert for engagement by the latch when the hood is in the hood closed position.

The latch catch may include a catch mount, for example spaced apart reinforcing members embedded partially within the catch body. The spaced apart reinforcing members may define a mounting bracket receiving opening or slot therebetween. A projecting flange of a vehicle mounting bracket may be positioned in the slot and connected to the reinforcing members to mount the latch catch to the mounting bracket and thereby to the vehicle.

The reinforcing elements may comprise first and second reinforcing plates, one with an elevation adjustment flange projecting outwardly in a direction which is generally perpendicular to the main body of the associated plate. This flange is in a position for engagement by the elevation adjustment element, such as mentioned above, for use in adjusting elevation of the catch during hood closed position adjustment.

In an illustrated embodiment, the hood latch includes a latch base coupled to one of the hood or vehicle body, and most preferably to the hood. A handle is pivotally coupled to the latch base so as to pivot about a first pivot axis. A latch hook is pivoted to the handle for pivoting about a second pivot axis spaced from the first pivot axis. The latch hook includes a catch engaging hook portion and a pivot portion with the latch hook being pivoted to the handle at the pivot portion. When the hood is in the hood closed position and the latch assembly is latched, the catch engaging hook portion of the latch hook engages the latch catch. For example, the hook portion may engage the above mentioned pin positioned in the head of the latch engaging portion of the latch catch. In addition, a biasing element biases the catch engaging hook portion of the latch hook away from the latch catch.

As yet another aspect of the invention, the pivot portion of the hook may have a friction enhanced gripping surface to facilitate manual movement of the latch hook in opposition to the bias applied by the biasing element and into initial engagement with the latch catch.

As a still further aspect of the present invention, the latch and latch catch are most preferably oriented on the vehicle and relative to one another so as to apply a latching force in the same direction as the hood moves as it reaches the closed position. Thus, the latch catch and latch may be oriented vertically when the hood is pivoted to the hood closed position.

To improve the aerodynamic characteristics of the vehicle, the latch assembly may be positioned at a location shielded from air flowing along the outer exterior surfaces of the hood and vehicle fender. In a specific approach, in a vehicle wherein the hood pivots forward relative to the vehicle body to open the hood and the hood includes a rear edge having top and side portions, the vehicle includes a cowl which together with the hood defines a cowl opening adjacent to the rear side edge portions of the hood, the latch and latch catch are positioned in the cowl opening when the hood is closed. As a result, the hood shields the hood latch assembly from direct impact by an air stream passing along the outer surfaces of the hood as the vehicle moves in a forward direction.

It is therefore one object of the present invention to provide an improved vehicle hood latch assembly.

Another object of the present invention is to provide a vehicle hood latch assembly which maintains a substantially constant load on the latch assembly as the closed position of a hood is adjusted.

Another object of the present invention is to provide an improved latch catch for a hood latch assembly.

A further object of the present invention is to provide an improved latch for a hood latch assembly.

Yet another object of the present invention is to provide an aerodynamically improved hood latch assembly.

It should be noted that the present invention is directed to the above advantages, features and objects individually, or collectively, or both. Thus, for example, features of the present invention offer advantages in situations where the relative positions of the latch and latch catch are not adjusted during hood closed position adjustment. However, significant additional advantages are realized in situations where the relative positions of these latch assembly components are maintained during adjustment of the hood closed position. Furthermore, the present invention is applicable to situations where the hood latch assembly is not positioned in a cowl opening or otherwise shielded from the air stream flowing along the outer vehicle surfaces. Thus, the present invention is not limited to any one feature, object or advantage in combination with other features, objects and advantages of the present invention, but is solely limited by the claims which define the invention.

These and other features, advantages and objects of the present invention will become apparent with reference to the following description and drawings.

DETAILED DESCRIPTION OF THE PREFERRED EMBODIMENTS

Figure 1:
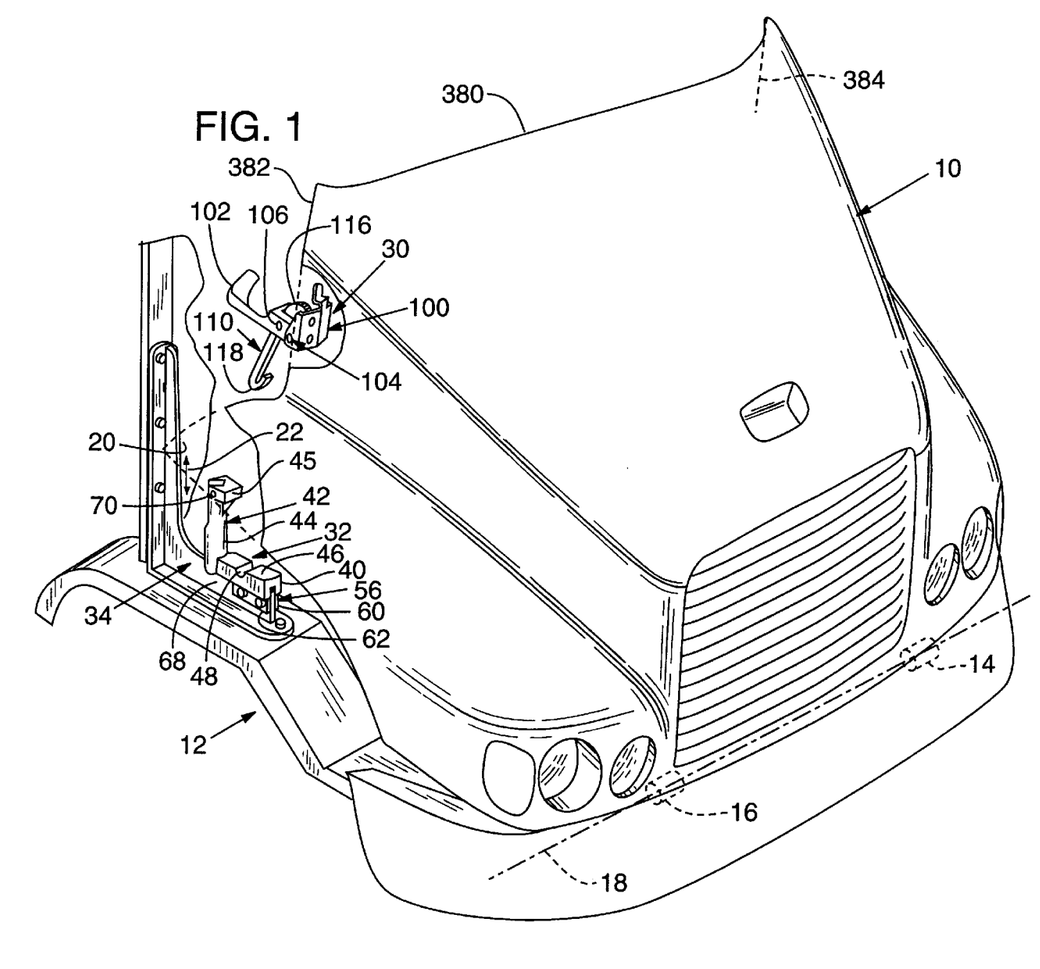
FIG. 1 is a partially broken-away front perspective view of a vehicle with a vehicle hood and a hood latch assembly in accordance with one specific embodiment of the present invention.

With reference to FIG. 1, a vehicle is shown having a hood 10 mounted to the body of the vehicle indicated generally at 12, for movement of the hood between open and closed positions. In FIG. 1, the hood is pivoted to the body by pivots indicated schematically at 14, 16 for pivoting about a hood pivot axis indicated generally by the dashed line 18. In this construction, the rear of the hood is raised or lowered about pivot axis 18 as the hood is opened. For example, a fender covering portion 20 of the hood is raised upwardly or downwardly as indicated by arrow 22 as the hood reaches or is lifted from the hood closed position. The present invention is useful whether the hood is pivoted to the vehicle body or mounted to the vehicle body in some other manner.

As previously mentioned, often the hood closed position is adjusted after the hood is installed to, for example, align surfaces of the hood with other portions of the vehicle. The present invention facilitates this hood adjustment and facilitates the maintenance of a substantially constant load on the hood latch assembly when latched, regardless of the ultimate hood closed position.

Figure 6:
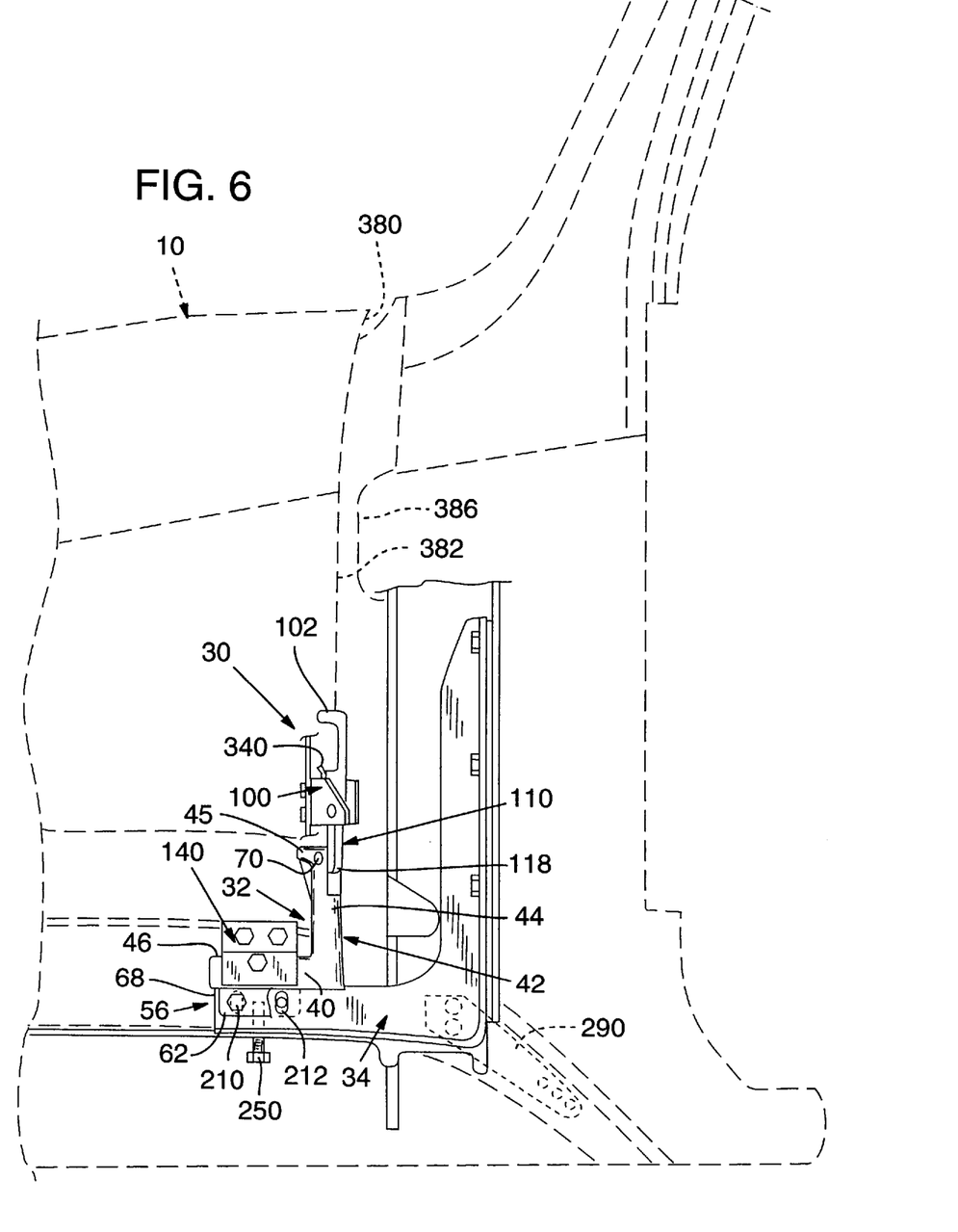
FIG. 6 is a partially broken-away side elevational view of the latch and latch catch of FIG. 1 shown mounted to a vehicle in engagement with one another, and with portions of the vehicle shown in dashed lines.

The illustrated latch assembly includes a latch, such as indicated generally at 30 in FIG. 1, which is coupled to one of the vehicle hood or vehicle body, in this case mounted to the vehicle hood. In addition, a latch catch, such as indicated by the number 32 in FIG. 1, is coupled to the other of the vehicle hood or vehicle body, in this case to the vehicle body. The latch 30 and latch catch 32 are positioned relative to one another such that, when the hood is in the hood closed position, the latch 30 may be shifted into engagement with the latch catch 32 so as to latch the hood of the vehicle body in the closed position. FIG. 6 illustrates the latch and latch catch in an engaged or latched position.

As explained more fully below, at least one of the latch catch and latch are most preferably adjustable relative to the respective hood or vehicle body to which they are mounted so as to maintain the relative positions of the latch and latch catch substantially constant. As a result, as the closed position of the hood is adjusted, the latch catch, latch, or both, may also be adjusted to maintain their relative positions. Consequently, a substantially constant load may be maintained on the latch and latch catch as the hood closed position is shifted. If the relative positions of the latch and latch catch were only partially adjusted to compensate for changes in the hood closed position, this would be an improvement and is within the scope of the present invention, but is less preferred than having the relative positions of the components (e.g. their distance apart) remain the same as the hood closed portion is adjusted.

With reference to FIG. 1, in the illustrated embodiment the latch catch 32 is shown mounted to be adjustable relative to the vehicle body. The latch 30 could also be mounted so as to be adjustable. However, in this case the latch is mounted to the hood at a fixed position. More specifically, the latch catch 32 is coupled to a mounting bracket 34 which, in turn, is mounted or otherwise coupled to the body of the vehicle. The latch catch is mounted to the mounting bracket so as to permit raising and lowering of the latch catch relative to the mounting bracket to thereby adjust the position of the latch catch. As explained below, the latch catch 32 is most preferably slidably coupled to the mounting bracket 34 to permit selective sliding of the latch catch relative to the bracket. After the latch catch is in the desired position, it may be fastened in place, such as by bolts or other fasteners, until such time, if any, that further adjustment of the latch catch is desired.

The illustrated latch catch 32 includes a catch body 40, a latch engaging portion 42 projecting outwardly and upwardly from the catch body (when mounted as shown in FIG. 1). The latch engaging portion 42 includes an elongated neck 44 with an enlarged head portion 45 spaced from the catch body and positioned at the distal or upper end of the neck 42. The latch catch body 40 also includes a hood engaging portion 46 which, in the illustrated embodiment, comprises an upper surface of the catch body 40. A recess 48, in this case a transversely extending groove (a groove extending parallel to the pivot axis 18), is provided in the upper surface of the catch body for purposes explained below.

Although not required, most preferably the latch catch 32 is formed of a resilient vibration-absorbing material with the exception of reinforcing elements that may be included in the latch catch. One specifically suitable material is EPDM rubber having a durometer of 80 on the Shore A scale measured at 73° F. Other resilient vibration dampening materials may be used. In addition, one segment of this neck portion 44, in cross section, preferably consists essentially entirely of this resilient material. Although not required, this construction effectively further isolates vibrations that would otherwise be imparted from the vehicle hood to the vehicle and vice versa. Because the illustrated latch 30 and thus the hood 10 are coupled to the latch catch 32 at the head portion 45 and the hood engages the hood engaging surface 46 of the catch body, enhanced isolation of hood vibrations is achieved.

Although variable, the illustrated neck 42 has a cross-section of about one square inch and applies a latching force of about 80 pounds to the hood after 40 hours of installation. The latching force may, of course, be varied. In addition, one hood latch assembly is typically provided at each side of the vehicle.

A catch mount 56 comprising reinforcing elements, such as first and second plates 60, 62, is included in the latch catch 32. In the illustrated embodiment, the plates 60, 62 are partially embedded in the catch body 40 and function to couple the latch catch 32 to the mounting bracket 34. More specifically, the latch catch 32 is coupled to an upright flange 68 of the mounting bracket 34. In addition, the head portion 45 of the latch catch 32 supports a latch engaging pin 70, which is engaged by the latch 30 when the latch assembly is operated to latch the hood in a hood closed position.

With continued reference to FIG. 1, the illustrated latch 30 includes a latch base 100 mounted to the hood 10. A handle 102 is pivoted to the latch base by a pivot 104 for pivoting about a first pivot axis. A latch hook 110 is pivoted to handle 102 by a pivot pin 106 for pivoting about a second pivot axis spaced from the first pivot axis. The latch hook includes a pivot portion 116 which is pivoted by pin 106 to handle 102 and a catch engaging hook portion 118. The catch engaging hook portion 118 forms a hook which engages the pin 70 of the latch catch 32 when the latch assembly is latched.

Figures 2, 3, 4:
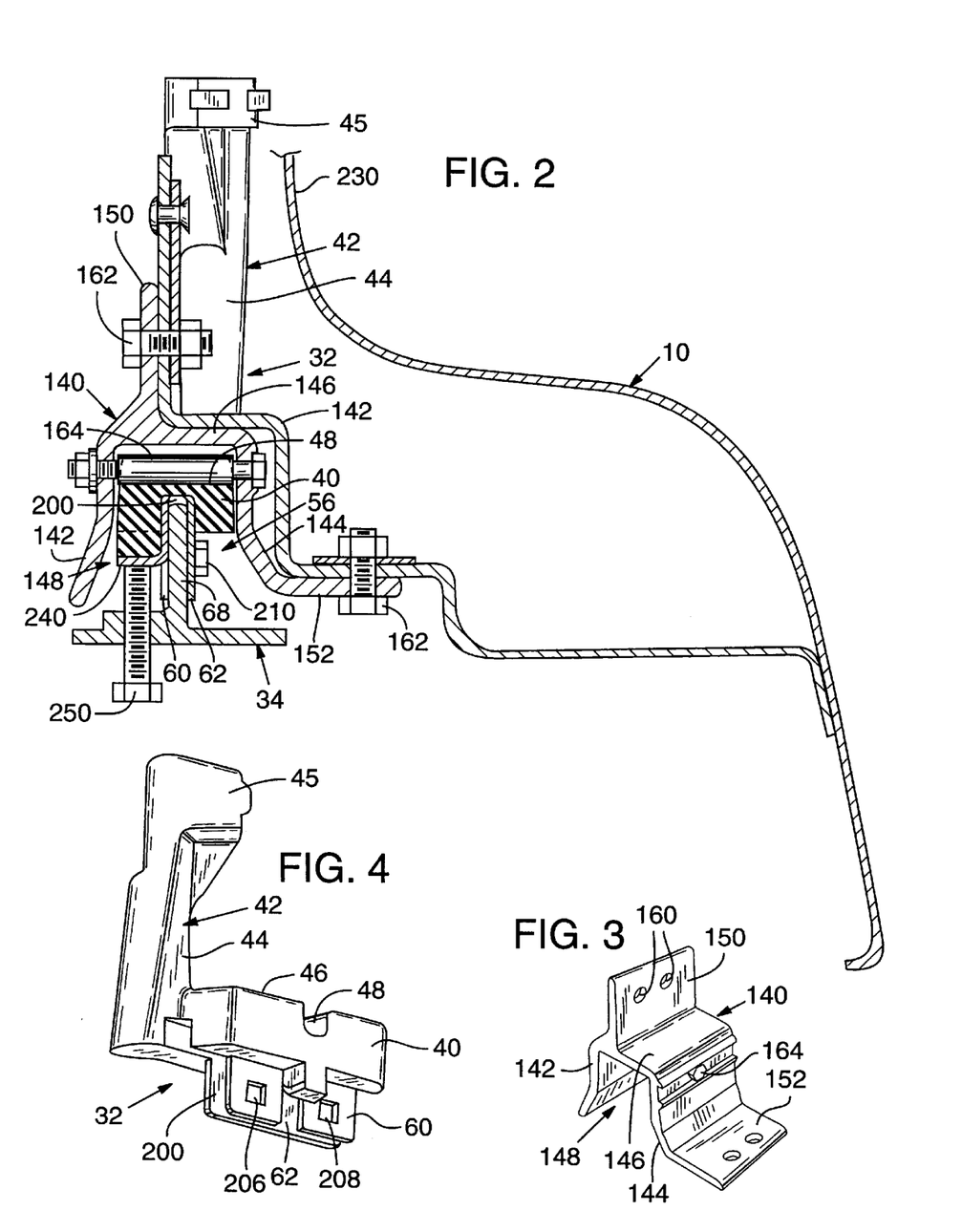
FIG. 2 is a vertical sectional view, looking toward the rear of the vehicle, taken through a portion of the hood and the latch catch of FIG. 1 with the hood in a hood closed position.
FIG. 3 is a perspective view of one form of a stop for mounting to a hood to engage the latch catch of FIG. 2 and establish the closed position of the hood.
FIG. 4 is a perspective view of the latch catch of FIG. 1.

With reference to FIG. 2 and FIG. 3, a stop 140 is shown mounted to an interior reinforcing flange 142 of the hood 10. More specifically, the illustrated stop 140 has first and second legs 142, 144 which are spaced apart from one another and which project outwardly in the same direction from a base 146. The legs 142, 144 define a catch receiving channel 148 therebetween. A hood mounting flange 150 projects from base 146 in a direction opposite to the direction of projection of flanges 142, 144. In addition, another hood mounting flange 152 projects outwardly, in a direction perpendicular to flange 153, from a lower edge of leg 144. The hood mounting flanges 150, 152 are provided with fastener receiving openings 160, two of which are numbered in FIG. 3. Bolts or other fasteners 162, two of which are shown in FIG. 2, couple the respective flanges 150, 152 to the hood reinforcing flange 142. A stop or pin 164 extends transversely across the channel 148. The stop 164 is supported at its respective ends by the leg flanges 142, 144.

As shown in FIG. 2, when the hood is in a closed position, the stop 164 is positioned within the recess 48 and rides upon the upper surface of the catch body. With this construction, the stop 164 assists in establishing the fore/aft location of the hood. In addition, vibration isolation again is enhanced due to the resilient nature of the stop engaging surface.

Figures 7, 8, 9:
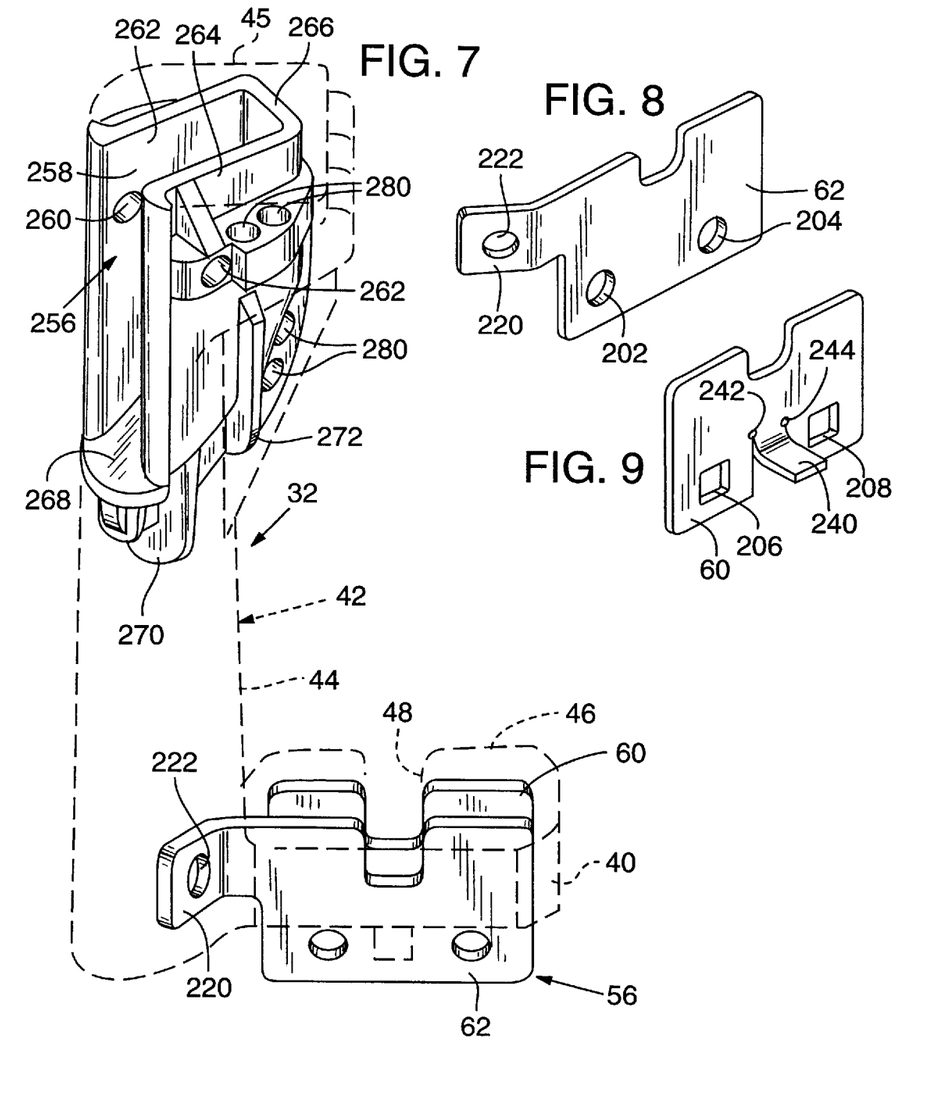
FIG. 7 is a perspective view of the latch catch of FIG. 1 in accordance with the present invention, with portions of the latch catch shown in dashed lines to reveal a latch pin receiving insert and reinforcing plates positioned within the latch catch.
FIGS. 8 and 9 are perspective views of the reinforcing plates included in the latch catch of FIG. 7.

FIGS. 2, 4, and 7–9 show various reinforcing elements included within latch catch 32. As can be seen in these figures, the reinforcing plates 60, 62 have main portions which are generally flat and planar. Plates 60, 62 are disposed parallel to and spaced apart from one another to define a flange receiving groove 200 (FIG. 2, FIG. 4) therebetween. Plate 62 includes fastener receiving openings 202, 204 (FIG. 8) and plate 60 includes fastener receiving openings 206, 208 (FIG. 9). Openings 206, 208 are typically square to engage carriage bolts inserted therethrough to prevent the bolts from rotating when their associated nuts are tightened or loosened. Openings 206, 208 are preferably positioned at the engine side of the latch assembly to increase the accessibility of their nut receiving ends which are thus at the opposite side of the assembly. When the plates 60, 62 are embedded in position within the catch body, the opening 202 is aligned with the opening 206, and the opening 204 is aligned with the opening 208. These openings are also exposed (see FIG. 4) so that fasteners (e.g. such as the bolt 210 shown in FIG. 2) may be inserted through these openings and through a corresponding opening in the flange 68 of the mounting bracket 34 to mount the catch body to the mounting bracket. The fastener receiving openings provided in mounting flange 68 are elongated, one such opening being indicated at 212, in the vertical direction. Consequently, prior to tightening the fasteners 210, the catch 32 may be slid upwardly or downwardly on flange 68 and relative to the mounting bracket to adjust the position of the latch catch 32.

Referring again to FIG. 8, a flange portion 220 of plate 62 projects from the main body of this plate at an angle for positioning within the base of the neck portion 44 of the latch catch 32 (see FIG. 7, except that FIG. 7 shows the plate 62 for the opposite of the vehicle from plate 62 of FIG. 8). Flange 220 reinforces the interconnection of the neck portion 44 to the catch body 40. As best seen in FIG. 2, the neck 42 of the catch body 40 has a longitudinal axis which is offset from the longitudinal axis of the elongated catch body 40. As a result, the neck is shifted toward the outer fender flange 230 (FIG. 2), while still being positioned inside the exterior surface of the fender when the hood is in a closed position. The flange 220 also includes an interlock opening 222. In the case of a molded latch catch 32, material forming the neck 42 flows during manufacture of the latch catch 32 and into the opening 22. When it cures, this material provides a mechanical interlock between the plate 62 and the catch body 40.

With reference to FIG. 9, the plate 60 includes a flange 240 projecting perpendicularly outwardly from the main body of the plate. Relief openings 242, 244 are provided through plate 60 at the upper end of the boundary between the main body of the plate 60 and the, flange 240. These relief openings minimize the risk of fracturing or tearing of the plate at such locations.

With reference to FIG. 2, an elevation adjustment element, in this case a threaded bolt 250, threadably engages the vehicle or, in this case, the mounting bracket 34 and has an upper end which abuts the undersurface of flange 240. With fasteners 210 loosened, the bolt 250 may be rotated to raise or lower the catch body 40, depending upon the direction of rotation of bolt 250. That is, as bolt 250 is turned, the position or elevation of the catch body 40 is adjusted. Stop 164 rests on the catch body 40 and thereby couples the catch body to the hood when the hood is in the closed position. Therefore, the adjustment of bolt 250 also adjusts the hood closed position. In addition, because the latch engaging portion 42 is coupled to the catch body 40, the position of the latch engaging portion is adjusted simultaneously with the adjustment of the hood closed position.

FIG. 7 illustrates one form of pin supporting insert which may be included within, as by molding, the head portion 45 of the latch catch 32. The insert 256 defines a latch hook receiving groove or trough 258. The illustrated insert 256 is generally of a U-shaped cross-section having first and second legs 262, 264 which are parallel to one another and which project outwardly from a common base 266. One end, in this case the lower end, of the trough 256 is closed by an end portion 268 of the insert 256. Pin receiving openings 260, 262 are provided through the respective legs 262, 264 for receiving a latch pin 70 (FIG. 1). The insert 256 (FIG. 7) includes a plurality of projecting flanges, such as 270, 272, for example, which are embedded into the head portion 45 and neck portion 44 of the latch catch 32 when the latch catch is molded or otherwise formed. Flanges, such as 270, 272, provide reinforcing surfaces which assist in retaining the insert within the head portion 45 and also resist forces exerted on the latch catch by the latch when the hood assembly is latched in a closed position. Interlock openings, such as 280, are also provided in the flanges of the insert to provide a mechanical interlock of the insert 256 and the latch catch head portion 45 during formation. That is, for a molded latch catch, the insert 256 and plate 60, 62 are positioned so that material, during molding, flows into the interlock openings and assists in locking the insert and plates 60, 62 in place.

Although the insert 256 may be made of any suitable material, the insert is typically a monolithic one-piece insert and may be formed of nylon with reinforcing fibers, such as glass fibers present in an amount of about forty percent by weight.

Figure 6A:
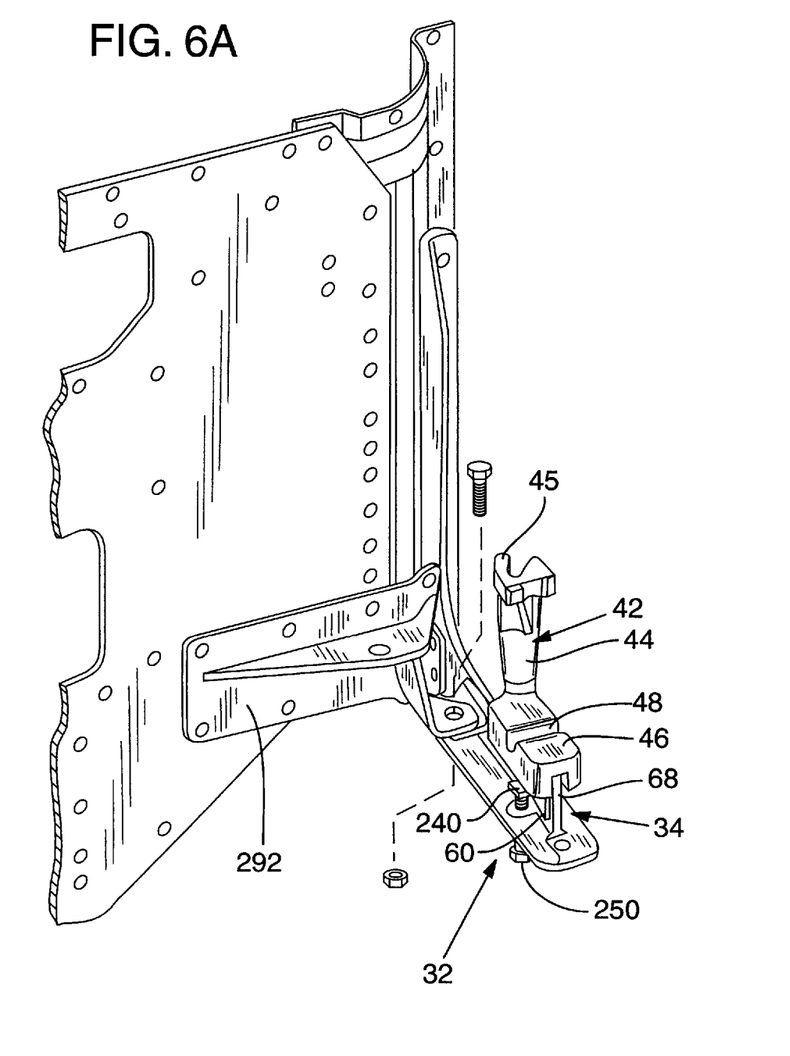
FIG. 6A is a perspective view of the latch catch and mounting bracket of FIG. 1 which shows reinforced coupling of the mounting bracket to the vehicle.

With reference to FIGS. 6 and 6A, the mounting bracket 34 is mounted to the vehicle body, such as by bolts or other fasteners. Reinforcing plates such as 290, 292, may be used to further reinforce and anchor the mounting bracket to the vehicle body. Also, for added reinforcement and as shown in FIG. 1, the forward end of the bracket 34 may be connected to the vehicle, for example, bolted to a wheel well cover.

Figure 5:
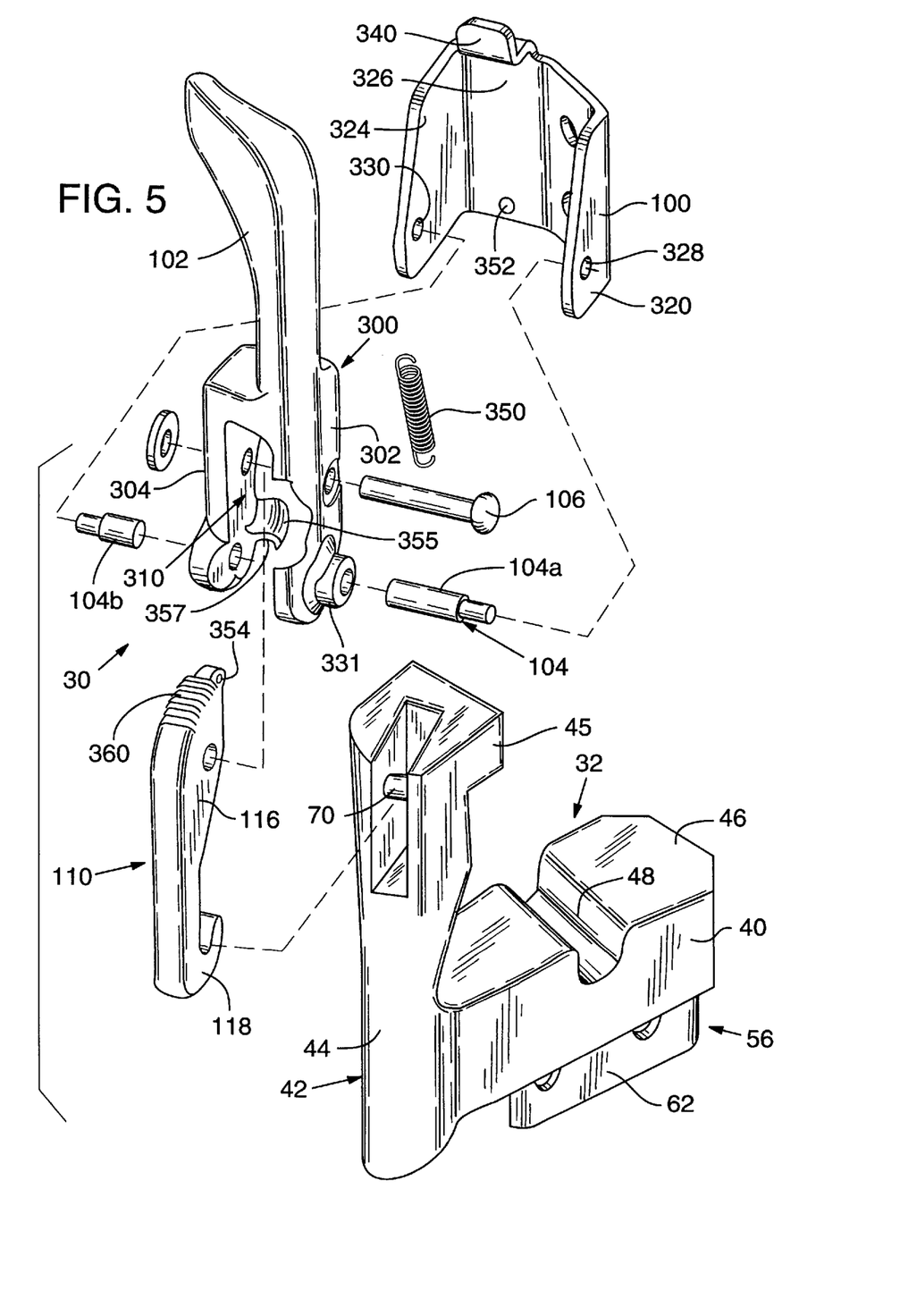
FIG. 5 is an exploded view of the latch assembly of FIG. 1 including a latch and latch catch.

With reference to FIG. 5, the handle 102 is of an aerodynamically contoured shape with a lower portion 300 bifurcated into spaced-apart legs 302, 304. A latch hook receiving slot 310 is provided between the legs 302, 304. The pivot portion 116 of the latch hook 110 is positioned in the slot 310 and pivoted to handle 102 within the slot by a pivot pin 106. The leg 302 has an inward projection bounding a portion of the pin 106 receiving opening to urge the hook 116 within slot 310 toward leg 304. The pivot 104, in the illustrated form, is comprised of pivot pin sections 104a and 104b. The pivot pin section 104a is coupled to leg 302 and pivot pin section 104b is coupled to leg 304. Because the pivot pin sections 104a, 104b, which define the pivot 104, do not extend across the slot 310, latch hook 110 may freely pass between the spaced apart ends of the pin sections 104a, 104b as it pivots in slot 310. Pivot pin sections 104a, 104b may comprise rivets spun into place. The illustrated base 100 includes a pair of legs 320, 324 which are spaced-apart from one another and project outwardly from a back portion 326. A handle receiving slot is thereby defined between the legs 320, 324. Openings 328, 330 receive the respective pivot portions 104a, 104b to pivot the handle 102 to the base 100. A boss, such as 331, projects outwardly from each leg 302, 304 to center the handle within the handle receiving slot.

A stop 340 projects outwardly from back portion 326 to engage and limit the pivoting motion of the handle when the latch assembly is in the latched position. The operation of the stop 340 to limit the motion of handle 102 is shown in FIG. 6. Referring again to FIG. 5, a biasing element, such as a coil spring 350 (although any biasing mechanism may be used) couples the pivot portion 116 of latch hook 110 to the base 326. More specifically, an opening 354 is provided in an upper end of latch hook 110 and an opening 352 is provided in the base 100. The respective ends of spring 350 are hooked in openings 352, 354. Also, a spring guiding projection 355, with a spring receiving channel 357 along its back surface, projects inwardly from the leg 304. The spring 350, when the apparatus is assembled, rests in channel 357. The biasing element is operable to bias the hook portion 118 away from the latch hook engaging pin 70 of the latch assembly. Consequently, once the hook portion 118 clears the latch catch pin 70, it is held away from the latch catch to permit opening of the hood without further interference.

The uppermost surface of pivot portion 116, indicated generally at 360 in FIG. 5, is knurled, or otherwise provided with a friction enhancing or gripping surface. Consequently, as the hood approaches the hood closed position, a driver may manually operate the latch catch, by, for example, placing his or her thumb on the surface 360 and pivoting the latch hook 118 into initial engagement with the pin 70. Thereafter, the handle 102 may be pivoted upwardly (in FIG. 5) to shift the pivot axis defined by pivot 106 (about which latch hook 110 is pivoted to the handle) from a first position below the handle pivot axis defined by pivot 104 to a second position above the handle pivot axis to thereby latch the latch assembly in an over-center latching state.

Although other materials may be used, the base 100 and plates 60, 62 are typically of a rigid material, such as steel. In addition, the handle 102 and latch hook 110 are typically of the same material as the insert 256.

With reference to FIGS. 1, 2 and 6, the hood latch assembly of the present invention is preferably shielded from the exterior surface of the hood, and thus from the air stream flowing along the vehicle exterior surface. This improves the aerodynamics of the vehicle as the latch does not project into the wind or air traveling along the exterior of the vehicle as the vehicle moves in a forward direction.

As a specific example, the hood 110 may include a rear edge 380 (FIG. 1) and side edges 382, 384. As shown in FIG. 6, the vehicle is provided with a cowl 386 which curves inwardly behind the hood 10 to define a cowl opening or gap between the rear side edges of the hood and the cowl. The latch assembly, including the latch catch 32 and latch 30, is positioned within this cowl opening and thus interiorly of the hood exterior surface, as can be seen in FIG. 2. Again, this enhances the aerodynamics of the vehicle. To operate the latch, an operator need only reach into the cowl opening and release the handle.

In operation, the mounting bracket 34 is mounted to the vehicle body and the latch catch 32 is coupled to the mounting bracket without tightening the fasteners 210 (FIG. 2). In addition, the latch 30 is mounted to the hood structure in position so that the latch hook 118 of the latch 30 will engage pin 70 of the latch catch 32 (FIG. 1) when the hood is in a closed position. The hood position may be adjusted to its desired hood closed alignment. The hood may be supported by shims or other supports in its properly aligned position. When in the desired position, the elevation adjustment element, such as bolt 250 (FIG. 2) is adjusted to bring the latch catch surface 46 against the hood stop 140. The bolts 210 are then tightened to secure the latch catch in the desired position to support the hood in the adjusted hood closed position. The relative position of the latch catch 32, and, in particular, the hook engaging portion 70 of the latch catch, is simultaneously adjusted so that the relative positions of the latch 30 and latch catch 32 are maintained substantially constant. This, in turn, maintains the desired load on the hood latch assembly when latched in a closed position.

Even if the latch catch were fixedly mounted to the vehicle body, advantages are still achieved by the present invention. For example, in addition to other advantages, the latch catch provides vibration isolation between the vehicle body and the hood, particularly when the latch is coupled to the latch catch through a portion of the latch catch which is resilient.

By shielding the latch assembly from air flowing along the exterior surfaces of the hood, the aerodynamic characteristics of the vehicle are improved. That is, the latch does not project or extend into the path of air stream of moving air traveling along the exterior surfaces of the hood when the hood is in its hood closed position and the vehicle is traveling forward.

It should be understood that the present invention may be modified in arrangement and detail without departing from its principles. We claim as our invention all such modifications as fall within the scope of the following claims.

We Claim:

1. A vehicle having a hood mounted to a body of the vehicle for movement of the hood between open and closed positions, at least one portion of the hood moving upwardly as the hood is opened, the closed position of the hood being adjustable such that said one portion of the hood raises or lowers as the closed position of the hood is adjusted, and a hood latch assembly comprising:

a latch coupled to one of the vehicle hood or vehicle body;

a latch catch coupled to the other of the vehicle hood or vehicle body, the latch catch having a body and latch engaging portion, in position to be engaged by the latch so as to latch the hood to the vehicle body when the hood is in the closed position, the latch catch also having a hood engaging portion spaced from the latch engaging portion and positioned to engage the hood at a location spaced from the latch engaging portion when the hood is in the hood closed position;

a latch catch adjustably coupled to the other of the vehicle hood or vehicle body such that adjustment of the elevation of the hood engaging portion simultaneously adjusts the elevation of the latch engaging portion to maintain the relative positions of the latch and latch catch substantially constant as the closed position of the hood is adjusted to thereby maintain a substantially constant load on the latch and latch catch at various hood closed positions.

2. A hood latch assembly according to claim 1 in which the latch catch has a body and which is coupled to the vehicle body and wherein the latch catch has a neck projecting upwardly from the body, the latch engaging portion being included in the neck.

3. A hood latch assembly according to claim 2 including a mounting bracket coupled to the body of the vehicle, the latch catch being mounted to the mounting bracket so as to be raisable and lowerable relative to the mounting bracket, and wherein both the hood engaging portion and spaced apart latch engaging portion are raised and lowered together with the raising and lowering of the latch catch.

4. A hood latch assembly according to claim 3 in which the latch catch is slidably coupled to the mounting bracket, the assembly also including an elevation adjustment element coupled to the mounting bracket and to the latch catch such that adjustment of the elevation adjustment element raises or lowers the latch catch relative to the mounting bracket to thereby adjust the relative positions of the latch catch and latch and maintain a substantially constant load on the latch and latch catch at various hood closed positions.

5. A hood latch assembly according to claim 1 in which the latch body is comprised of an elastomeric material.

6. A vehicle having a hood mounted to a body of the vehicle for movement of the hood between open and closed positions, at least one portion of the hood moving upwardly as the hood is opened, the closed position of the hood being adjustable such that said one portion of the hood raises or lowers as the closed position of the hood is adjusted, and a hood latch assembly comprising:

a latch coupled to one of the vehicle hood or vehicle body;

a latch catch coupled to the other of the vehicle hood or vehicle body in position to be engaged by the latch so as to latch the hood to the vehicle body when the hood is in the closed position;

at least one of the latch catch and latch being adjustable to maintain the relative positions of the latch and latch catch substantially constant as the closed position of the hood is adjusted to thereby maintain a substantially constant load on the latch and latch catch at various hood closed positions;

at least one of the latch and latch catch is simultaneously adjusted as the closed position of the hood is adjusted to thereby maintain the relative positions of the latch and latch catch;

wherein the latch catch is coupled to the vehicle body and the latch is coupled to the hood, the latch catch including a latch engaging portion which is engaged by the latch when the hood is latched by the latch assembly in a closed position, the latch catch also including a hood engaging portion which engages the hood when the hood is in the closed position, the latch catch being coupled to the vehicle body so as to be selectively raisable and lowerable relative to the vehicle body to thereby raise or lower the latch engaging portion and the hood engaging portion simultaneously, whereby adjustment of the position of the latch catch adjusts the hood closed position due to the raising or lowering of the hood engaging portion and whereby the relative position of the latch and latch catch is maintained substantially constant due to the raising or lowering of the latch engaging portion of the latch catch as the latch catch is raised or lowered.

7. A hood latch assembly according to claim 6 in which the latch catch includes a catch body, the latch engaging portion projecting upwardly and outwardly from the catch body when the latch catch is coupled to the vehicle, and wherein the hood engaging portion comprises a portion of the catch body.

8. A hood latch assembly according to claim 7 in which the hood engaging portion is comprised of a resilient material.

9. A hood latch assembly according to claim 7 in which the hood engaging portion defines a recess, the hood including a stop mounted to the hood in a position to rest in the recess when the hood is in the hood closed position.

10. A hood latch assembly according to claim 9 in which the hood engaging portion is comprised of a resilient material which defines the recess and the stop includes a pin positioned in the recess when the hood is in the hood closed position.

11. A hood latch assembly according to claim 6 in which the hood engaging portion is coupled to the vehicle body so as to selectively slide upwardly and downwardly relative to the vehicle body, the hood latch assembly including an elevation adjustment element coupled to the hood engagement portion and also to the vehicle body, the elevation adjustment element being selectively movable relative to the vehicle body to slide the hood engagement member upwardly or downwardly to raise or lower the hood engagement portion.

12. A hood latch assembly according to claim 6 in which the latch includes a latch base coupled to the hood, the latch also including a latch member pivoted to latch base and movable between second positions in which the latch member is released from the latch catch to a first position in which the latch member engages the latch engaging portion of the latch catch to thereby latch the hood in a closed position.

13. A vehicle having a hood mounted to a body of the vehicle for movement of the hood between open and closed positions, at least one portion of the hood moving upwardly as the hood is opened, the closed position of the hood being adjustable such that said one portion of the hood raises or lowers as the closed position of the hood is adjusted, and a hood latch assembly comprising:

a latch coupled to one of the vehicle hood or vehicle body;

a latch catch coupled to the other of the vehicle hood or vehicle body in position to be engaged by the latch so as to latch the hood to the vehicle body when the hood is in the closed position;

at least one of the latch catch and latch being adjustable to maintain the relative positions of the latch and latch catch substantially constant as the closed position of the hood is adjusted to thereby maintain a substantially constant load on the latch and latch catch at various hood closed positions; and wherein the hood pivots forward relative to the vehicle body to open the hood and the hood includes a rear edge having top and side portions, the vehicle including a cowl which together with the hood defines a cowl opening adjacent to the side portions of the hood, and wherein the latch and latch catch are positioned in the cowl opening when the hood is closed such that the hood shields the hood latch assembly against the flow of air passing along the outer surfaces of the hood as the vehicle moves in a forward direction.

14. A latch catch for a vehicle having a hood which is movable between open and closed positions, the latch catch being engagable by a hood latch for latching the hood in a closed position, the latch catch comprising:

a catch body;

a latch engaging portion comprising a resilient material and projecting upwardly from the catch body into a position for engagement by the hood latch at a location above the catch body;

the catch body including a hood engaging surface which is positioned to engage the hood at a location below the latch engaging portion when the hood is in a hood closed position; and the catch body also including a catch mount, whereby the latch catch may be coupled by the catch mount to the vehicle.

15. A latch catch for a vehicle having a hood which is movable between open and closed positions, the latch catch being engagable by a hood latch for latching the hood in a closed position, the latch catch comprising:

a catch body;

a latch engaging portion projecting outwardly from the catch body;

the catch body including a hood engaging surface which engages the hood when the hood is in a hood closed position; and the catch body also including a catch mount, whereby the latch catch may be coupled by the catch mount to the vehicle; and the latch engaging portion has an elongated neck, the neck including a section which consists essentially of an elastomeric material.

16. A vehicle having a hood mounted to a body of the vehicle for movement of the hood between open and closed positions, at least one portion of the hood moving upwardly as the hood is opened, the closed position of the hood being adjustable such that said one portion of the hood raises or lowers as the closed position of the hood is adjusted, and a hood latch assembly comprising:

a latch coupled to one of the vehicle hood or vehicle body;

a latch catch coupled to the other of the vehicle hood or vehicle body in position to be engaged by the latch so as to latch the hood to the vehicle body when the hood is in the closed position;

at least one of the latch catch and latch being adjustable to maintain the relative positions of the latch and latch catch substantially constant as the closed position of the hood is adjusted to thereby maintain a substantially constant load on the latch and latch catch at various hood closed positions; and wherein the latch catch includes an elongated neck and wherein the neck includes a head portion spaced from the latch body, a latch pin receiving insert embedded in the head portion, and a latch engaging pin positioned in the latch pin receiving insert, the pin being engagable by the latch when the hood is in the hood closed position.

17. A latch catch according to claim 16 in which the catch mount includes spaced apart reinforcing members embedded partially within the catch body, the reinforcing members defining a mounted bracket receiving opening therebetween, whereby a flange of a vehicle mounted mounting bracket may be positioned in the mounting bracket receiving opening to mount the catch body to the vehicle.

18. A latch catch according to claim 17 wherein said reinforcing members comprise a pair of spaced apart plates, one said plates including an elevation adjustment flange projecting outwardly in a direction generally perpendicular to the main body of the plate.

19. A latch catch according to claim 16 in which the neck includes a section below the latch pin receiving insert which is essentially of an elastomeric material.

20. A hood latch for a vehicle having a hood which is movable between open and closed positions, the hood latch being a part of a hood latch assembly for latching the hood in a closed position, the hood latch comprising:

a latch base coupled to one of the hood or the vehicle body;

a handle pivotally coupled to the latch base so as to pivot about a first pivot axis;

a latch hook pivoted to the handle so as to pivot about a second pivot axis spaced from the first pivot axis, the latch hook including a catch engaging hook portion and a pivot portion, the latch hook being pivoted to the handle at the pivot portion;

a latch catch coupled to the other of the hood or vehicle body in position to be engaged by the catch engaging hook portion of the latch hook, whereby the hood is latched upon pivoting the handle in a first direction about the first pivot axis when the vehicle hood is in the closed position and the latch catch is engaged by the latch engaging hook portion; and a biasing element coupled to the latch hook so as to bias the catch engaging hook portion of the latch hook away from the latch catch.

21. A hood latch assembly according to claim 20 in which the latch catch and latch are oriented vertically when the hood is in its closed position so as to apply a downward hood latching force when the hood is latched in the closed position.

22. A hood latch assembly according to claim 20 in which the pivot portion of the hook has a friction enhanced gripping surface which facilitates manual initial movement of the latch hook in opposition to the bias and into engagment with latch catch.

23. A hood latch assembly according to claim 20 in which the handle defines a yoke, the upper pivot portion of the hook being positioned in the yoke of the handle.

24. A hood latch assembly according to claim 20 in which the second pivot axis is shifted from a first position to one side of the first pivot axis to a second position at the other side of the first pivot axis as the handle is pivoted in the first direction to provide an over-center latching action when latching the hood in the closed position, and in which the handle is pivotally coupled to the hood and the latch catch is coupled to the vehicle body, the first pivot axis being positioned above the second pivot axis prior to pivoting the handle in the first direction, the second pivot axis shifting to a position above the first pivot axis as the handle is pivoted from the first portion to the second position.

25. A vehicle comprising a hood pivotally mounted to a body of the vehicle, the hood having a front portion adjacent to the front of the vehicle and a rear portion adjacent to a windshield of the vehicle, the hood defining a cowl opening adjacent to the rear of the hood;

a latch catch adjustably coupled to one of the hood or vehicle body, the latch catch having a latch engaging portion and a hood engaging portion spaced from the latch engaging portion;

the latch catch being coupled to one of the hood or vehicle body such that the elevation of the latch engaging portion is adjusted simultaneously with the adjustment of the elevation of the hood engaging portion;

a latch coupled to the other of the hood or vehicle body, the latch being positioned to engage the latch engaging portion of the latch catch with the hood engaging the hood engaging portion engaging the hood when the hood is in a closed postion;

the latch and latch catch being positioned within the cowl opening such that the hood shields the latch and latch catch against air flowing along the outside of the hood as the vehicle is moving forward.

26. A vehicle comprising a hood pivotally mounted to a body of the vehicle, the hood having a front portion adjacent to the front of the vehicle and a rear portion adjacent to a windshield of the vehicle, the hood defining a cowl opening adjacent to the rear of the hood;

a latch catch coupled to one of the hood or vehicle body;

a latch coupled to the other of the hood or vehicle body, the latch being positioned to engage the latch catch when the hood is in a closed position;

the latch and catch being positioned within the cowl opening such that the hood shields the latch and latch catch against air flowing along the outside of the hood as the vehicle is moving forward; and a mounting bracket coupling the latch catch to the vehicle body, the latch catch including a hood engaging portion positioned to engage the hood when the hood is in a closed position, the latch catch and thereby the hood engaging portion being mounted to the bracket for selective raising and lowering relative to the mounting bracket to adjust the closed position of the hood, whereby the relative position between the latch and latch catch is maintained during hood adjustment and correspondingly a substantially constant load is maintained on the latch and latch catch as the hood closed position is adjusted.

\* \* \* \* \*

UNITED STATES PATENT AND TRADEMARK OFFICE
CERTIFICATE OF CORRECTION

PATENT NO.    : 5,826,672

DATED         : October 27, 1998

INVENTOR(S)   : Holter et al.

It is certified that error appears in the above-identified patent and that said Letters Patent is hereby corrected as shown below:

| Col./Line | Error Reads | Should Read |
|---|---|---|
| 1/17 | Pa. and | Pa., and |
| 8/41 | the, flange | the flange |
| 14/42 | recevining | receiving |

Signed and Sealed this

Tenth Day of April, 2001

*Attest:*

NICHOLAS P. GODICI

*Attesting Officer*    *Acting Director of the United States Patent and Trademark Office*